United States Patent [19]

Hogan

[11] Patent Number: 5,687,931
[45] Date of Patent: Nov. 18, 1997

[54] PARACHUTE GROUND DISCONNECTING DEVICES

[75] Inventor: James V. Hogan, Cassidy, Canada

[73] Assignee: Irvin Industries Canada Limited, Fort Erie, Canada

[21] Appl. No.: 504,525

[22] Filed: Jul. 20, 1995

Related U.S. Application Data

[63] Continuation-in-part of Ser. No. 299,748, Sep. 1, 1994, abandoned, which is a continuation-in-part of Ser. No. 126,255, Sep. 23, 1993, abandoned.

[51] Int. Cl.⁶ ............................................. B64D 17/38
[52] U.S. Cl. ............................. 244/151 B; 294/82.25; 294/82.33
[58] Field of Search ................... 244/150, 151 R, 244/151 A, 151 B; 294/82.33, 82.25, 82.32, 119, 119.4, 94, 89

[56] References Cited

U.S. PATENT DOCUMENTS

| | | | |
|---|---|---|---|
| 2,665,163 | 1/1954 | Gross | 241/151 A |
| 2,732,245 | 1/1956 | Lenoigue | 244/151 A |
| 2,919,154 | 12/1959 | Schart | 294/82.25 |
| 3,493,260 | 2/1970 | Smith | 294/82.33 |
| 3,531,066 | 9/1970 | Baekka | 294/82.32 |
| 3,596,973 | 8/1971 | Anderson | 294/119 |

FOREIGN PATENT DOCUMENTS

| | | | |
|---|---|---|---|
| 226424 | 1/1969 | U.S.S.R. | 244/151 B |
| 782667 | 9/1957 | United Kingdom | 244/151 B |

*Primary Examiner*—Galen L. Barefoot
*Attorney, Agent, or Firm*—Howard M. Ellis; Marianne Fuierer

[57] ABSTRACT

Reusable parachute ground disconnecting devices provide constant release load percentages within a range of 25 to 70 percent of the load weight for more reliable delatching characteristics on ground contact even in the presence of high ground winds, and with virtually no risk of premature delatching occurring while airborne. Non-linear main springs consisting of stacked disk springs provide ever diminishing deflection to the load suspending assembly as the load size increases, in combination with fixed latch geometry produce constant load release characteristics for the entire capacity rating for a given device. Various time delay means, including an hydraulic dampened load release timer provide added safety and reliability by isolating the delatching system when fluctuations in load weight occur during initial deployment. Disclosed concepts are readily adaptable to high capacity devices for loads of up to 30 tons, and even more.

44 Claims, 11 Drawing Sheets

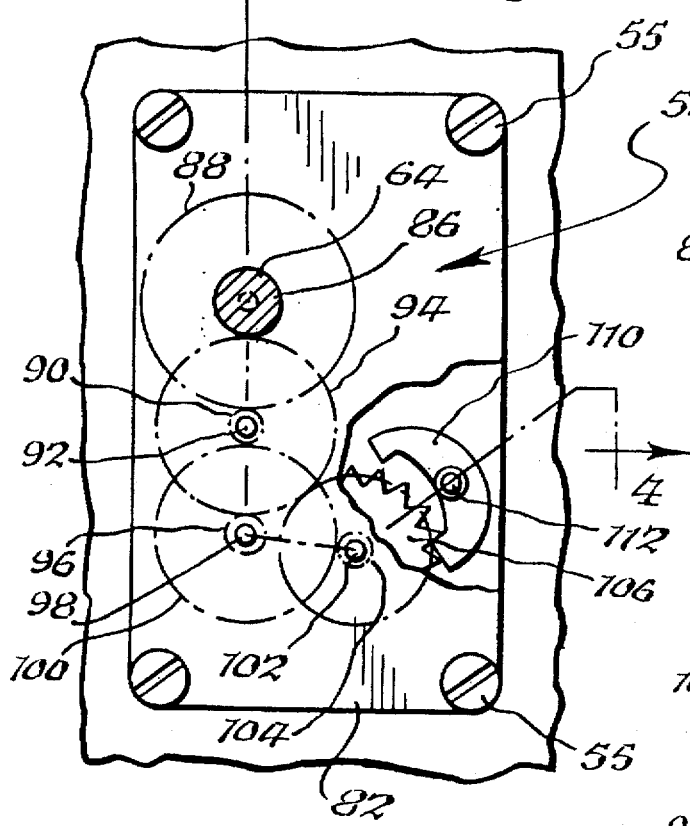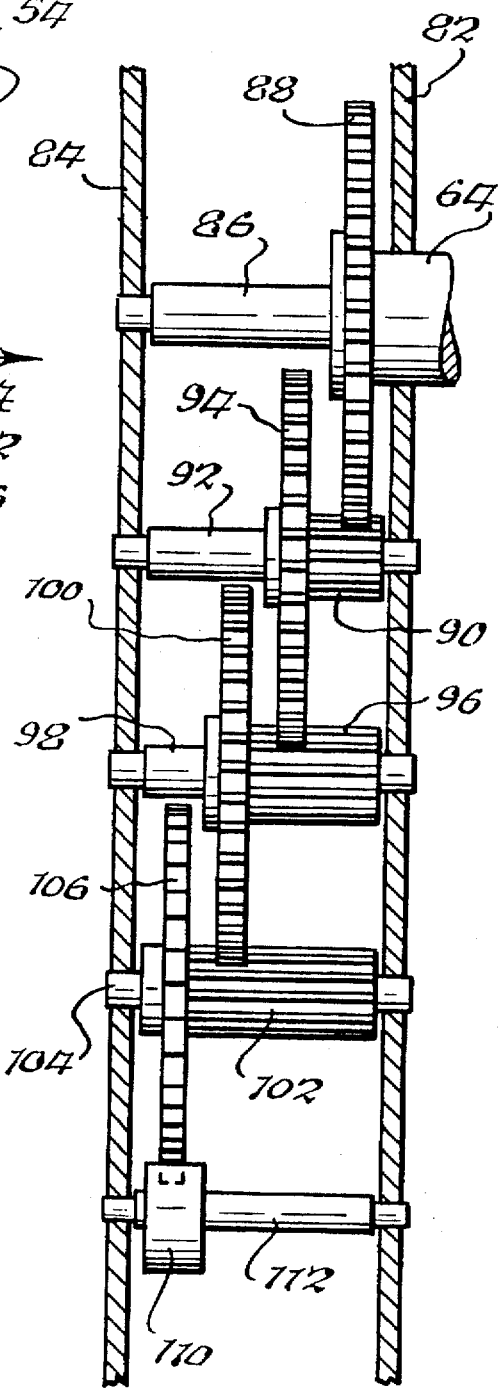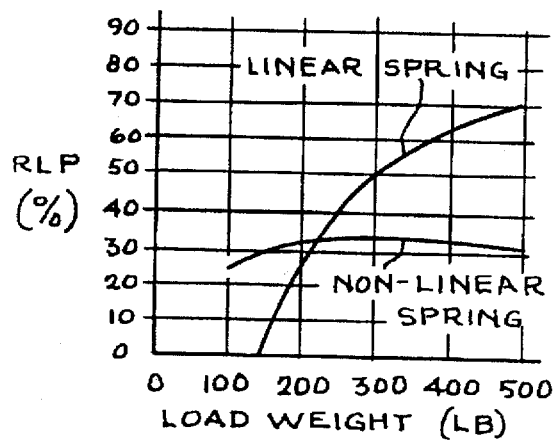

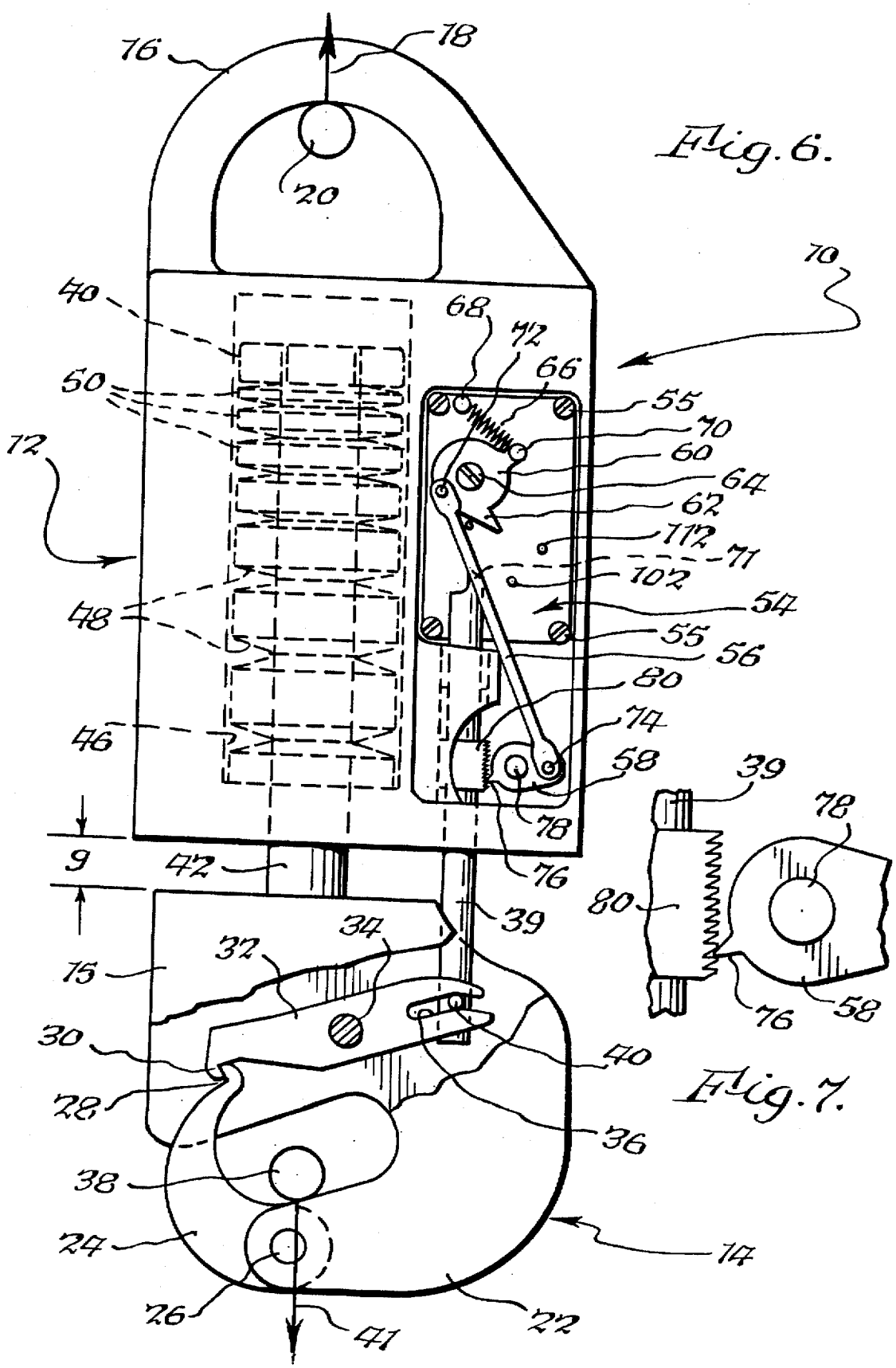

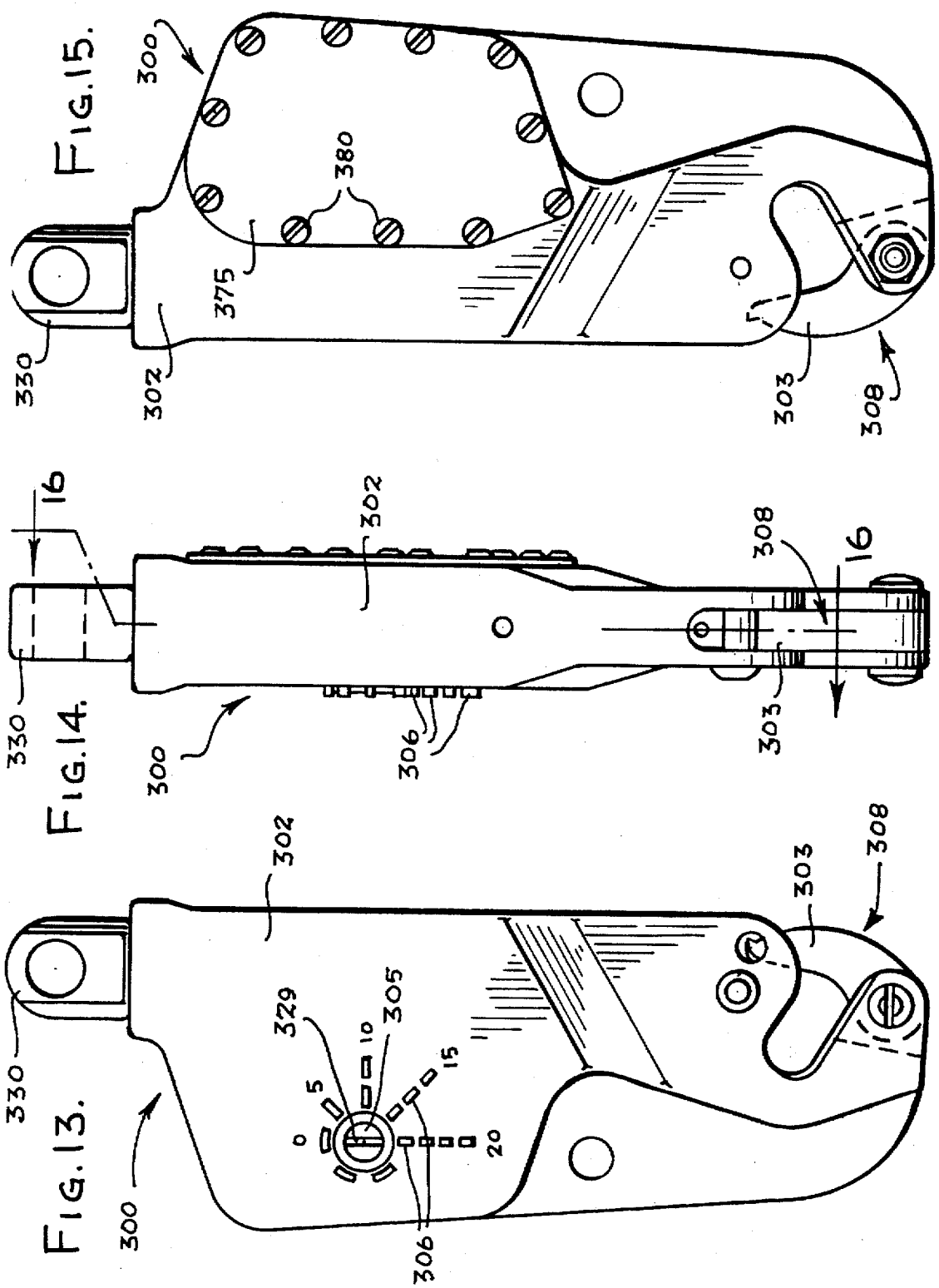

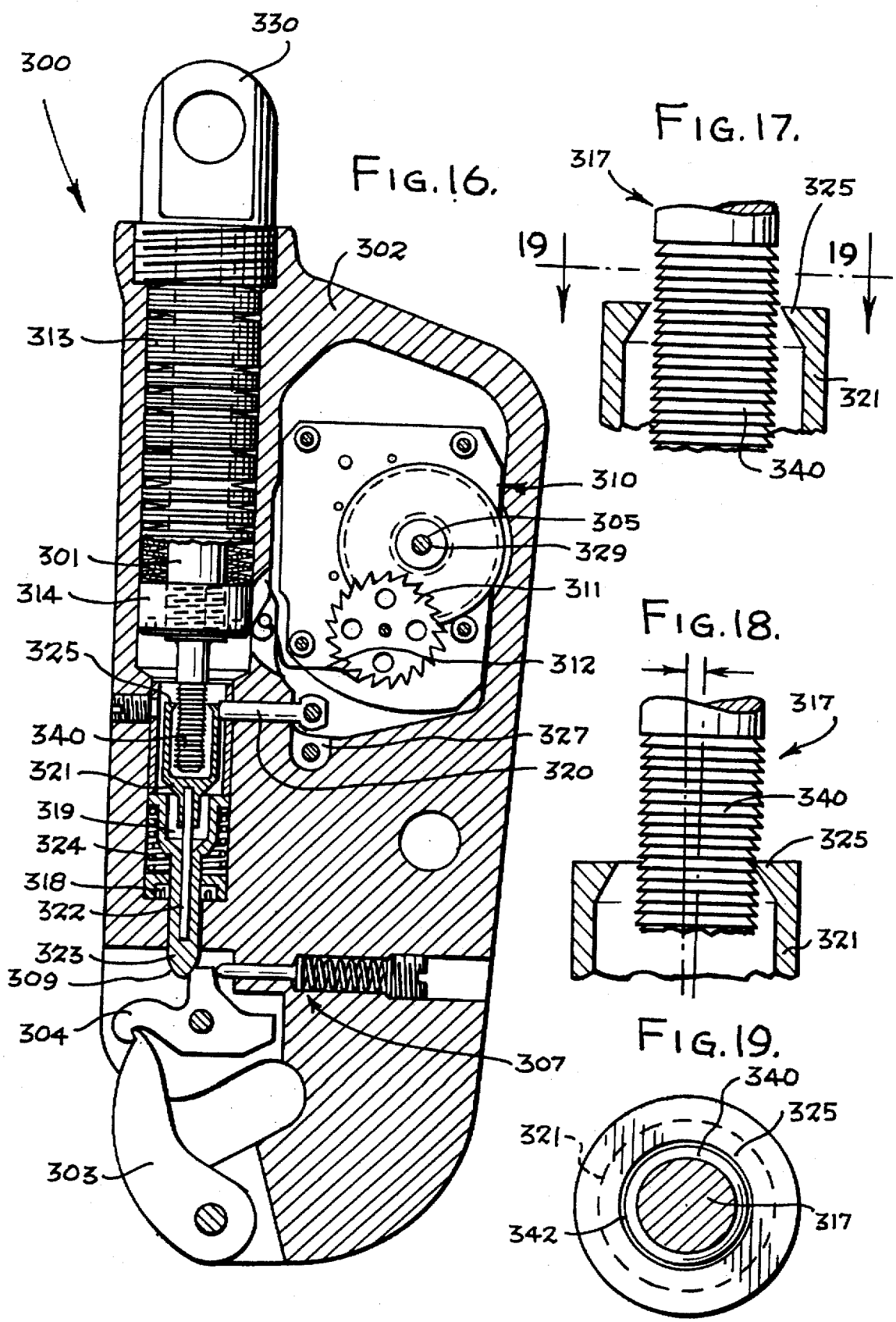

PARACHUTE GROUND DISCONNECTING DEVICES

CROSS REFERENCE TO RELATED APPLICATION

This application is a continuation-in-part of application Ser. No. 08/299,748, filed Sep. 1, 1994, which is a continuation-in-part of application Ser. No. 08/126 255 filed Sep. 23, 1993, both now abandoned.

TECHNICAL FIELD

The present invention relates generally to the field of parachute accessories, and more specifically to improved devices which allow for the automatic release of parachute borne loads upon contact with the ground.

BACKGROUND OF THE INVENTION

In parachuting a load from an airplane it is important that the load be safely secured to the parachuting means during descent. Likewise, it is also important for the load to be spontaneously released from the parachuting means upon striking the ground, or other supporting surface. Unless there is immediate separation of the load from the parachuting means on ground contact the load can be dragged over the supporting surface by surface winds engaging the parachute.

Parachute ground disconnecting devices have been developed which automatically release a payload with ground contact. Such devices perform as coupling means between the parachute and load to safely secure loads when suspended during descent of the parachute. When the load makes contact with the ground so the load weight falls the coupling device should automatically open to allow separation of the load and parachute.

One significant problem associated with parachute ground disconnecting devices heretofore has been overcoming fluctuations in effective load weight during descent. For example, in the first few seconds after parachute deployment, forces applied to disconnecting devices can drop off severely or vary significantly due to transient parachute inflation phenomena. The device may repeatedly oscillate due to snatch forces, parachute over-inflation and swing through. To overcome such significant variations in forces the release load percentage or "RLP", which is the ratio of the tension at the instant of disconnection to the weight of the load during steady descent, can be lowered, e.g. below 25 percent. This however, can result in the parachute ground disconnecting device not readily releasing its load on ground contact, or exhibiting poor high wind release characteristics. In fact, many earlier parachute ground disconnecting devices required total slack-off of tension when the cargo made ground contact. But, with ground winds catching a parachute at the time of desired disconnection there was usually no slack of tension and the release device would not actuate. In attempting to modify ground disconnecting devices so the weight required to initiate load disconnection is more than zero and in some cases closer to the real weight of the load, i.e. a RLP of >40 percent, trade-offs in descent security can result which increase the potential for premature delatching of the device and load loss while still airborne.

Hence, it has been observed that prior efforts have not been entirely satisfactory in developing parachute ground disconnecting devices capable of providing both a high degree of load security at all stages of descent and conditions while also providing the desired instantaneous load release characteristics upon ground contact, especially in the presence of high ground winds and soft ground conditions.

For instance, U.S. Pat. No. 2,732,245 appears to disclose an automatic parachute release coupling device which employs a time delay mechanism, main canopy activation and ground disconnecting action. However, this earlier device relied on coil type springs exclusively. It was found that with such linear type springs constant RLPs were not readily achieved. As a result, it was not possible to produce reliable load disconnection on ground contact throughout the entire rated load capacity of the device, under all wind and ground conditions.

Other such devices have relied on load suspending assemblies having components which were not integral and capable of moving as fixed geometry units. Consequently, if after parachute deployment load force drops off or varies significantly, and erratic movements occur there is increased risk of premature delatching occurring. In addition, some earlier devices lacked the desired high degree of reliability, especially during the first few seconds after deployment before stable steady descent occurs. During this stage of descent if the disconnecting mechanism is not isolated from other component systems as to be rendered fully inoperative, the risk of premature delatching can also be greater.

Earlier automatic parachute release devices, such as those disclosed by U.S. Pat. No. 2,732,245, while possessing merit, also relied on systems which added to the technical complexity and concomitant cost of the devices, making them largely impractical and non-economic, particularly those which were not readily reusable.

Accordingly, it would be highly desirable to have more reliable and reusable parachute ground disconnecting devices which provide constant release load ratios (as a percentage of suspended weight) over an entire load range rating for a given device. Such devices should be readily adaptable for a broad range of payload sizes, including ultra-heavy payloads of up to 30 tons or more, such as required in parachuting armored vehicles, and which have a high degree of reliability and do not prematurely delatch while airborne, and spontaneously separate from the parachute on ground contact, even in the presence of high winds.

SUMMARY OF THE INVENTION

Accordingly, it is a principal object of the invention to provide for improved parachute ground disconnecting devices, especially those which are capable of maintaining substantially constant RLPs. Generally, devices of the invention are characterized by a casing with at least one interior compartment, a load suspending assembly located at a first end of the device and means for connecting the device to a parachute located at a second end of the device. Structurally, the devices also consist of means for locking and releasing a load on the load suspending assembly and spring means positioned in the interior compartment of the casing. The spring means are effective in retaining the device in a retracted position when not under load and limiting downward deflection when under force of load. The devices also have timer means for actuating the means for locking and releasing a load on the load suspending assembly after lapse of a sufficient time interval for stabilized descent of the parachute and load, and for release of the load from the load suspending assembly as the spring means returns towards a fully retracted position upon ground contact by the load.

The spring means of the foregoing ground disconnecting devices are characterized by non-linear force displacement curves permitting load disconnection to occur throughout the rated weight capacity of the device when tension on the device falls to an adjustable range generally from 25 to about 70 percent of the load weight. Thus, the spring means can be comprised of a plurality of disk type springs placed in stacks to provide ever diminishing deflection with additional load applied to the load suspending assembly.

It is a further object to provide ground disconnecting devices wherein the means for locking and releasing a load on the load suspending assembly comprises a longitudinally movable bar or toothed rack member which freely moves with fluctuating load weights during the more turbulent initial period of descent, and bar or rack locking means automatically actuated by the timer means for engaging the movable bar or rack during stabilized descent and which releases the load from the load suspending assembly when the spring means returns towards a fully retracted position with ground contact by the load.

It is yet a further object to provide for devices consisting of an upper casing with an interior compartment and means for connecting with a parachute, and an axially aligned load suspending assembly which is movable relative to the upper casing. The load suspending assembly comprises a rod extending into the casing interior, connecting means for holding a load, means for locking and releasing a load from the connecting means, and gear means, such as a rack for engaging the locking and releasing means of the load suspending assembly at a first end. The rack extends into the upper casing interior at a second end. Importantly, the device is powered by main spring means providing restricted deflection. That is to say, the main spring means is characterized as non-linear (designed to a specific function) providing ever diminishing deflection of the lower load suspending assembly as additional load is applied. The main spring means is positioned in the casing interior for engaging with the rod of the load suspending assembly for retaining the load suspending assembly in a retracted position prior to deployment, and for limiting the stroke of the load suspending assembly away from the casing when a load is applied. The device also includes timer means for providing a delay interval corresponding substantially to a period running from the time of parachute opening to the time of stabilized descent. Other elements of the device include rack locking means automatically actuated by the timer means for engaging the rack for preventing longitudinal movement of the rack during stabilized descent, and when the distance between upper casing and the lower load suspending assembly moves towards zero upon ground contact by the load, to delatch the locking and releasing means for separating the load from the parachute.

It is thus a principal object of the invention to provide a reusable parachute ground disconnecting device characterized by constant RLPs over the entire rated load capacity, subject to the constraint of fixed latch geometry and associated fixed stroke to reliably actuate load release with ground contact. The objectives of the invention are more readily achieved thorough spring means characterized by non-linear force displacement curves permitting load disconnection to occur throughout the rated load capacity of the device when tension on the device falls to about 25 to about 40 percent of the real load weight. Significantly, the force of the load on the device need not drop to zero in order to effectuate delatching. Within the above range of 25 to 40 percent the risk of premature delatching or resistance to load disconnection occurring on ground contact is minimal. This is readily accomplished with a plurality of disk type springs placed in varying stacks for a shallow/short stroke of the load suspending assembly, even when under force of capacity loads. That is to say, deflection of the load suspending assembly from the upper casing is ever diminishing to a set final deflection, i.e. disks flattened, as additional load is applied.

It is still a further object of the invention to provide a parachute ground disconnecting device wherein the main spring means provides the energy for retraction of the load suspending assembly towards the upper casing on ground contact for disengagement of a lever mounted release arm to actuate delatching and load release.

It is yet a further object of the invention to provide timer means, such as in the form of a gear train and escapement, and other timer types for added security by providing automatic delays in actuating gear or rack locking means for about an initial 5 to 20 second period in which the release mechanism is isolated from possible premature release at the transient period of parachute deployment, and for readying the device for automatic ground disconnect during steady, stable descent.

It is still a further object of the invention to provide a heavy duty version of the parachute ground disconnecting devices having load ratings of several tons for large loads, heavy equipment, large personnel carriers, armored vehicles, and so on, also characterized by substantially constant release load percentages. The devices consist of an upper parachute disconnecting block suitable for engaging several parachutes and an axially aligned lower load suspending casing having interior compartments and means for connecting a load. The lower load suspending casing is movable relative to the upper parachute disconnecting block, the latter comprising a plurality of rods extending vertically downwardly into the interior of the lower load suspending casing. The parachute disconnecting block also includes an outer frame member for supporting a plurality of parachute riser fingers and parachutes when the fingers are locked, an axially slidable retainer assembly (spring loaded) positioned adjacent to the outer frame member for locking and releasing the parachute riser fingers, and a gear, such as a rack for engaging the slidable retainer assembly at a first end. The rack extends into the interior of the lower load suspending casing at a second end. Significantly, the device includes non-linear main spring means to provide ever diminishing deflection characteristics to the load suspending casing with additional load applied. The main spring means are positioned in the lower load suspending casing for engaging with the rods of the parachute disconnecting block for retaining the load suspending casing in a retracted position when not under load, and for limiting the stroke of the load suspending casing away from the parachute disconnecting block when under force of a load. The lower load suspending casing also includes timer means for providing a delay interval corresponding substantially to the period running from the time of opening of a parachute to the time of stabilized descent. Rack locking means are automatically actuated by the timer means for engaging the rack and preventing longitudinal movement of the rack during stabilized descent. When the distance between the load suspending casing and the parachute disconnecting block moves towards zero upon ground contact the main spring means retracts the axially slidable retainer assembly against its spring loading to delatch the parachute riser fingers and parachutes from the device. As with other embodiments of the device, delatching is not dependent on the load dropping to zero.

It is still a further object to provide an even more simplified embodiment of the parachute ground disconnecting device of this invention which still allows for maintaining a substantially constant release load percent, but where exact time delays for arriving at a steady, stable descent are less critical. This further embodiment consists of a casing with an interior compartment and means for connecting with a parachute. The device includes an axially aligned load suspending assembly movable relative to the casing, a rod extending into the casing interior, connecting means for holding a load, and means for locking and releasing a load on the connecting means with ground contact. The device employs load release timer means and main spring means both housed in the casing interior. The main spring means engages with the rod for retaining the load suspending assembly in a retracted position when not under load and for limiting the stroke of the load suspending assembly away from the casing when under force of a load. The load release timer means includes a pushrod cylinder, an axially aligned pushrod at a first end engaging the push rod cylinder and linking with the locking and releasing means of the load suspending assembly at a second end. Ram means are axially aligned with the pushrod cylinder and pushrod. Importantly, the load release valve means includes means for dampening vertical movement of the ram means and pushrod when under compression, such as on ground contact by the load.

It is still a further object to provide for ground disconnecting devices with load release timer means with dampening means for rams and adjacent pushrods comprising a piston with an aperture for non-compressible fluids for gradual displacement through the aperture over a period of approximately 2 to about 20 seconds. The device includes adjacent spring means positioned in the pushrod cylinder for compression and gradual movement of the ram means towards the pushrod and gradual displacement of the hydraulic fluid when a load is applied to the load suspending assembly.

It is still a further object to provide a parachute ground disconnecting device comprising a casing with at least one interior compartment, means for connecting the device to a parachute located at a first end of the casing, a load suspending assembly having latching means located at a second end of the casing, means for locking and releasing a load on the load suspending assembly including a longitudinally moveable bar affixed to the means for connecting the device to a parachute, and spring means positioned between the longitudinally moveable bar and the load suspending assembly. The spring means is characterized by limiting the downward deflection of the casing from the longitudinally moveable bar. The means for locking and releasing a load on the load suspending assembly comprises a longitudinally moveable bar affixed to the means for connecting the device to a parachute, axially aligned means for engaging with the longitudinally moveable bar and for releasing a load on the load suspending assembly on ground contact, means for laterally deflecting the axially aligned means for engaging with the longitudinally moveable bar and for releasing a load on the load suspending assembly on ground contact, and timer means for actuating the means for laterally deflecting the axially aligned means for engaging with the longitudinally moveable bar and for releasing a load on the load suspending assembly. The longitudinally moveable bar comprises a rack having a plurality of adjacent teeth.

It is still a further object of the invention to provide ground disconnecting devices wherein the axially aligned means for engaging with the longitudinally moveable bar and for releasing a load on the load suspending assembly comprises a cup means, a vertically rigid wire having one end engaged with the cup means, and a vertically moveable pin means for contacting and de-latching the latching means. The cup means is adapted to engage with at least one of the teeth of the rack.

It is still a further object of the invention to provide ground disconnecting devices wherein the means for laterally deflecting the axially aligned means for engaging with the longitudinally moveable bar and for releasing a load on the load suspending assembly is a horizontally moveable bar spaced from the cup means. The cup means is positioned on a vertical axis sufficiently close to the horizontally moveable bar to cause the cup means to disengage from the horizontally moveable bar and return to axial alignment after the vertically moveable pin means de-latches the latch on ground contact.

BRIEF DESCRIPTION OF THE DRAWINGS

For a further understanding of the invention, as well as its characterizing features reference should now be made to the accompanying drawings wherein:

FIG. 2 is a graph comparing RLPs of parachute ground disconnecting devices equipped with linear and non-linear type main springs for various load sizes;

FIG. 3 is an enlarged plan view of the timer employed in the parachute ground disconnecting device of FIG. 1;

FIG. 4 is an enlarged side view of the running components of the timer taken along lines 4—4 of FIG. 3;

FIG. 6 is a side elevational view of the parachute ground disconnecting device under load with the rack in locked position during steady descent;

FIG. 7 is an enlarged fragmented view of the rack teeth and rack locking means engaged therewith in accordance with FIG. 6.

FIG. 13 is a side elevational view of a further embodiment of the parachute ground disconnecting device of the invention.

FIG. 14 is an elevational end view of the parachute ground disconnecting device of FIG. 13.

FIG. 15 is a side elevational view opposite to that of FIG. 13.

FIG. 16 is a vertical section taken generally along line 16—16 of FIG. 14.

FIG. 17 is an enlarged fragmentary view of the rack and its companion pawl bell in a free position.

FIG. 18 is a fragmentary view, similar to FIG. 17, of the rack and pawl bell with the pawl edge engaged in the rack.

FIG. 19 is a horizontal cross sectional view taken along line 19—19 of FIG. 17.

DESCRIPTION OF THE PREFERRED EMBODIMENTS

Figure 1:
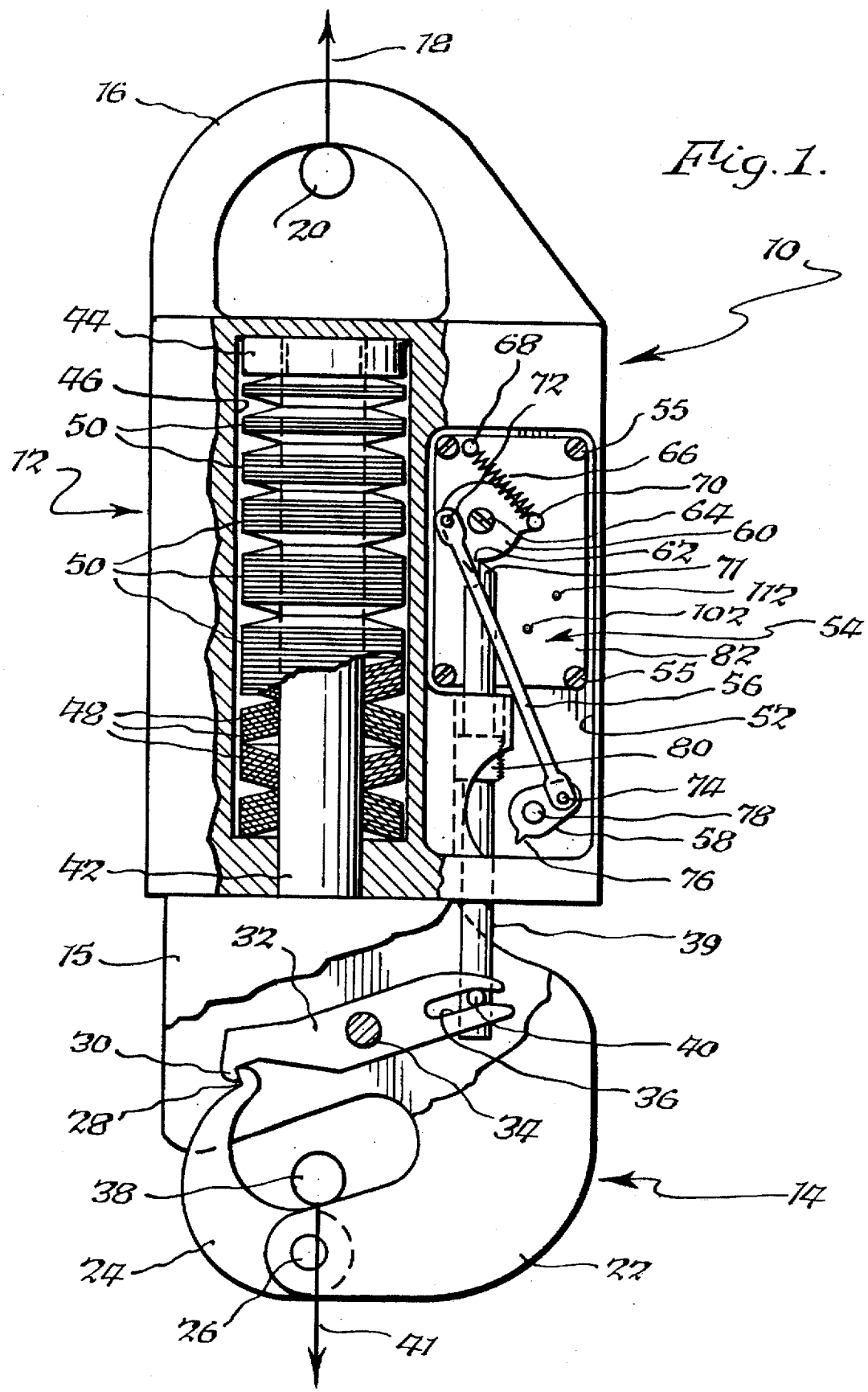
FIG. 1 is a side elevational view of the parachute ground disconnecting device in a non-loaded, resting position with parts of the outer case removed to show elements of the device.

Turning to FIG. 1, there is shown a preferred first embodiment of parachute ground disconnecting device 10 in resting position before being deployed. Device 10 may be used in supporting loads over varying weight ranges from under 45 kg (100 pounds) and up to several hundred kilograms. The capacity of a typical disconnecting device could range, for example, from about 34 kg (75 pounds) to about 227 kg (500 pounds). Larger capacity units for substantially heavier loads will be discussed in detail below. All such devices advantageously provide constant RLPs throughout their rated load capacities.

Disconnecting device 10 includes principal sections consisting of an upper casing or housing 12 and a lower axially aligned load suspending assembly 14. Integral with casing 12 is parachute connecting ring 16 for engaging with parachute 18, illustrated by a vertical arrow only. Parachute riser finger 20 shown sectionally may be affixed to the device via connecting ring 16.

Lower axially aligned load suspending assembly 14 is shown by FIG. 1 in fully retracted position butted against casing 12. Assembly 14 is partially sheathed by outer protective housing 15. The assembly consists of hook 22, release latch 24 pivotally mounted to hook 22 through yoke and threaded pin assembly 26, at one end, and locking edge 28 at a second end interconnected with edge 30 of release arm 32, the latter being rotatable through connecting pin 34. Release arm 32 includes slot 36 which slidably engages with pin 40 of rack 39.

Spring means (not shown) of conventional design exerts force to maintain release arm 32 in a locked position with release latch 24 prior to ground contact by the load. This retains load ring 38 of payload 41, shown only as an arrow, in a securely locked mode on hook 22. While not shown in FIG. 1, when device 10 is first deployed lower suspending assembly 14 translates downwardly from upper casing 12, and during the initial stages of descent rack 39 will be free to translate and move downwardly and upwardly in step with the lower suspending assembly without premature delatching of the device.

The lower suspending assembly further includes a rod 42 and nut 44 positioned for movement in cylinder 46 of the upper casing. As with rack 39, downward movement of rod 42 and nut 44 occurs in concert with a load suspended from hook 22 of the lower suspending assembly. Cylinder 46 is preferably filled with non-linear disk type springs 48 of conventional design mounted on rod 42 for limiting free downward movement of the assembly. More specifically, the principal objective of the non-linear type springs is ever diminishing deflection of the lower suspending assembly with additional load applied. As main springs of the device, this can best be achieved by nesting disk type springs into layered stacks 50 of varying numbers for RLPs of 25 to 40 percent over the entire rated load capacity for a given device.

Various stacking patterns may be used to achieve this end result. One includes nesting several springs together into concave formats wherein individual spring stacks are positioned in alternative directions, i.e. front to back, and so on.

It was discovered, for example, when spring stacks are layered in diminishing numbers/thicknesses where the largest stacks are positioned at the bottom of cylinder 46 and gradually decrease in number towards the top of the cylinder near nut 44 the desired ever diminishing additional deflection characteristics of the load suspending assembly with additional load applied occurs throughout the weight capacity rating of the device. That is to say, differential deflection will occur with a small load, e.g., 34 kg (75 pounds) to produce downward movement, e.g., 5 mm (0.20 inches) of the load suspending assembly from its resting point, whereas with a substantially larger load, e.g. 227 kg (500 pounds), the relative movement of the load suspending assembly will be, for example, only 10 mm (0.40 inches), or in other words, only 5 mm more for over 6.5 times more weight.

The significance of non-linear springs is demonstrated graphically by FIG. 2 and Tables I and II below:

TABLE I

| LINEAR SPRINGS | | | |
|---|---|---|---|
| Example | Starting Load (lbs) | Release Load (lbs) | RLP (%) |
| 1 | 500 | 350 | 70 |
| 2 | 400 | 250 | 63 |
| 3 | 300 | 150 | 50 |
| 4 | 200 | 50 | 25 |
| 5 | 100 | No Release | — |

TABLE II

| NON-LINEAR SPRINGS | | | |
|---|---|---|---|
| 1 | 500 | 155 | 31 |
| 2 | 400 | 130 | 32 |
| 3 | 300 | 100 | 33 |
| 4 | 200 | 65 | 33 |
| 5 | 100 | 25 | 25 |

FIG. 2 and Tables I–II demonstrate the absence of a constant release load percentage within the desired range of 25 to 40 percent of the starting/actual load weight with a ground disconnecting device equipped with linear springs, and constant RLPs with non-linear main springs within the desired range of 25 to 40 percent for all loads, regardless of weight.

In this manner, the ground disconnecting devices of the present invention achieve constant RLPs through non-linear springs to provide a load suspending assembly with a downward stroke characterized by ever diminishing deflection with additional load applied, in combination with fixed latch geometry for constant load release performance when the tension on the device falls to about 25 to about 40 percent of the starting load weight. Advantageously, the geometry of the latching means does not change with variations in load weight. Regardless of the particular value of gap "g" attained during steady descent, a specific amount of gap reduction, "Δg", is required on ground contact for release to occur. This is due to the fixed geometry of release latch 24 and release arm 32. Through the use of non-linear main spring stacks a condition is created wherein the main spring force drops nominally to 30 percent of its initial value within the operating range of the device with re-extension of the main spring by the amount Δg. The limited deflection of the load suspending assembly achieved with the non-linear springs even with heavier loads restricts the degree of total movement of the suspending assembly and ultimate movement of the latch geometry to effectuate delatching and load release. Hence, while greater weight will increase the deflection of the suspending assembly away from the upper casing somewhat, variations in load weight, and particularly loads of greater weight do not necessitate modification of the release latch geometry to effectuate reliable delatching and load release over lighter weight loads. Accordingly, constant RLPs are achieved within a desired range of 25 to about 40 percent of the real load weight to provide reliable delatching characteristics for all loads within the rated capacity of a given device on ground contact even in the presence of winds, all with high descent security, i.e., virtually no risk of premature delatching while airborne.

While the invention is specifically demonstrated with disk type springs, it should be understood that non-linear spring characteristics may also be substantially duplicated with other types of springs. For example, a short, rigid coil type spring in combination with a governor, for example, for limiting the downward stroke of rod 42 and nut 44, while less preferred, may nevertheless be employed in place of stacks of disk type springs.

In addition to cylinder compartment 46, upper casing 12 has a second compartment 52 for housing timer 54, pushrod 56, rack 39 and rack wedge 58. Timer 54 essentially functions as a "safety" by providing an initial delay period beginning with deployment of the parachute when turbulence and fluctuating load weights and movements present the greatest risks of premature delatching and load loss occurring before ground contact. During the initial 5 to 20 seconds after parachute deployment before steady descent of the load occurs timer 54 provides an important interval prior to activation of the ground disconnecting device by allowing unrestricted movement of rack 39. By allowing such unrestricted movement, momentary reductions in load weight due to transient parachute inflation, etc., and resulting retraction of the load suspending assembly by main spring 50 will prevent premature rotation of release arm 32 and unlocking of release latch 24. Accordingly, timer 54 isolates the delatching system during the initial transient period of parachute deployment until the load achieves equilibrium and steady descent.

With lapsing of the time delay and with steady descent of the parachute and airborne load, locking of rack 39 with rack wedge 58 occurs preventing further vertical movement of the rack. This effectively activates the disconnecting device for delatching to occur automatically upon ground contact as the weight load on the device falls to about 25 to about 40 percent of the starting weight.

Timer 54, which is mounted to the upper casing in compartment 52 by threaded mounting screws 55, includes a bellcrank 60 with locking ledge 62, cranking input shaft 64, cranking spring 66 mounted to the timer bearing plate 82 by pin 68 at a first end and to the bellcrank by pin 70 at a second end. In running mode, cranking spring 66 turns bellcrank 60 in a counter clockwise direction. FIG. 1 is shown with the timer wound for running by turning input shaft 64 clockwise prior to the device being deployed. The uppermost end of rack 39 includes a bellcrank lock 71 which rests against bellcrank ledge 62 at the time of deployment. FIG. 1 thus illustrates the configuration of the device prior to deployment when not under load. A first end of pushrod 56 is mounted for movement to bellcrank 60 with linking pin 72. Pushrod 56 is also mounted for movement at a second end to rack wedge 58 by linking pin 74. Rack wedge 58, which includes a locking tooth 76, is mounted for rotation to the upper casing 12 in compartment 52 by connecting pin 78. Hence, counter clockwise movement of bellcrank 60 produces a downward movement of push rod 56 and clockwise rotational movement of rack wedge 58, so as to bring locking tooth 76 in an upward position towards toothed rack collar 80.

Toothed rack collar 80 contains a plurality of adjacent teeth. Rack 39 and toothed rack collar 80 automatically index with movement of the load suspending assembly for engagement by locking tooth 76 of rack wedge 58 between teeth of collar 80. The particular teeth engaged with by locking tooth 76 is dependent on the weight of the load. Accordingly, the parachute ground disconnecting device provides the important benefit of automatic sensing and registration of load weight. Downward movement is determined by load weight. With a fully inflated parachute, stable steady descent and lapsing of the time delay rack 39, toothed collar 80 and lower suspending assembly 14 become locked against any further sliding movement relative to upper casing 12.

FIGS. 3–4 illustrate the internal components of one representative embodiment of timer 54 which is a gear train and escapement type. The timer consists of bearing plates 82, 84 with a plurality of drilled bearing holes for gears and shafts. Spring 66 (FIG. 1) applies counter clockwise rotational forces to bellcrank 60 and shaft 86 (FIGS. 3–4). Rotation of bell crank 60 turns gear 88 having 50 teeth with an 80 DP. Gear 88 meshes with pinion 90 having 10 teeth with an 80 DP on shaft 92. Gear 94 contains 48 teeth with a 96 DP. Rotation of gear 94 turns pinion 96 having 10 teeth with a 96 DP on shaft 98. Gear 100 contains 44 teeth with a 96 DP. Rotation of gear 100 turns escapement pinion 102 having 10 teeth with a 96 DP on escapement shaft 104. Escapement wheel 106 contains 24 teeth 60° sharp V form having a root diameter 8.13 mm (0.320 inches) and an outer diameter 10.62 mm (0.418 inches). Escapement wheel 106 mates with pallet 110. Revolution of escapement wheel 106 on shaft 112 causes pallet 110 to oscillate over a narrow angular range. Pallet 110 may have mass addition (not shown) for increased energy dissipation and reduced timer running speed.

Shafts 64, 86, 92, 98, 104 and 112 are free to rotate in bearing openings in each of plates 82 and 84. Spring 66 rotates bellcrank 60 and shaft 86. For every one rotation of shaft 86 there are 106 rotations of shaft 104 due to an increase in gear staging. For every one rotation of shaft 104, pallet 110 goes through 24 full cycles of small angular oscillation, coming to full stop twice per oscillation. Each time pallet 110 is brought to a full stop, its kinetic energy is dissipated in the form of acoustic emission, i.e. a "click" and mechanical vibration are generated.

Spring 66 imparts a certain amount of energy to the timer system and pallet 110 dissipates this energy. The speed of the timer is determined by the speed producing an equilibrium between input spring energy, which is relatively speed independent, and pallet percussion energy out, which is very speed dependent. The parameters which control the running speed consist of spring force; overall gear ratio; pallet angular travel from extreme to extreme, and moment of inertia of pallet 110 about the axis of shaft 112. In practice, the time delay is determined by the speed at which bellcrank 60 travels and how far the bellcrank has to travel from the point of release/ activation to the point of travel completion.

In most instances, timer 54 is actuated automatically. However, the timer can also be activated semi-automatically whereby the timer is provided with a pull pin (not shown) such that it can be rigged into the overall parachute system for starting the timer running when the parachute lines first reach their fully payed out state.

While the invention has been illustrated with timer means consisting of a gear train and escapement type timer having running times of about 5 to 20 seconds, it should be understood that other timers may be employed, e.g. pneumatic time delay, and so on.

Figure 5:
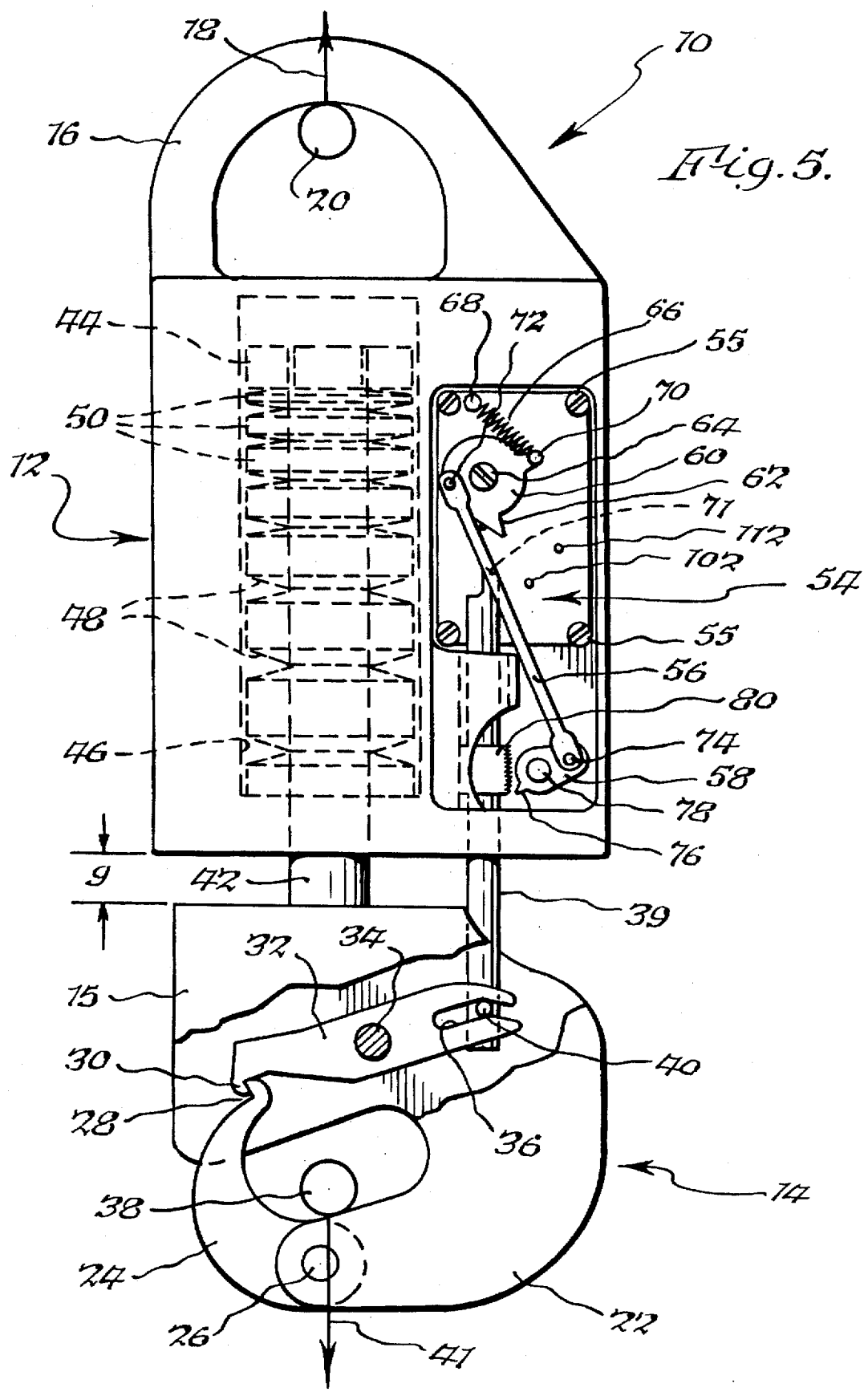
FIG. 5 is a side elevational view of the parachute ground disconnecting device under load with the timer running during initial deployment of the device.
Figure 8:
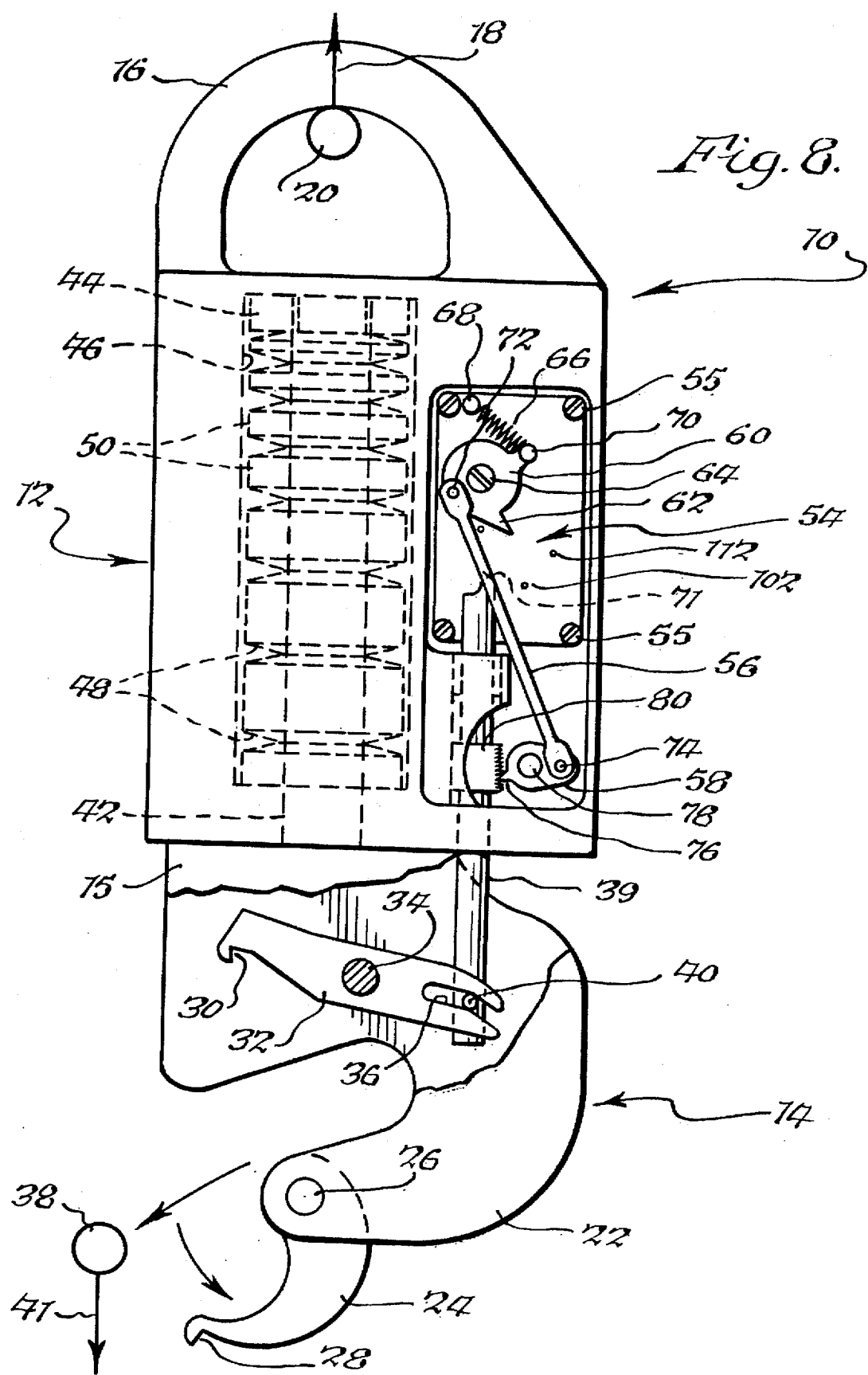
FIG. 8 is a side elevational view of the parachute ground disconnecting device upon load contact with the ground whereupon the device is unlocked and the load released.

Operation of the parachute ground disconnecting device may be demonstrated by reference to FIGS. 5–8. Initial parachute deployment causes hook 22 of the load suspending assembly 14 to separate from upper casing 12 by the distance "g" (FIG. 5). The downward force 41 overcomes the retracting force of disk springs 48 in forming gap "g". This initial downward movement causes bellcrank lock 71 on the end of rack 39 to disengage from locking ledge 62 on bellcrank 60. Bellcrank 60 begins to move counter clockwise under the action of spring 66. The rotational movement is slow and regular due to the damping imparted by gear train and escapement type timer 54. Pushrod 56 interconnecting bellcrank 60 and rack wedge 58 under counter clockwise movement of the bellcrank produces a slow and regular clockwise rotational movement of the rack wedge. Locking tooth 76 moves towards toothed rack collar 80 as the rack wedge rotates. So long as contact has not been made between locking tooth 76 and any teeth of rack collar 80, the lower suspending assembly 14, including rack 39, release arm 32, release latch 24, hook 22 and rod 42 are free to move together as a fixed geometry unit. If in the first few seconds after parachute deployment force 41 drops off severely or varies significantly due to transient parachute inflation the entire load suspending assembly can freely retract back to the upper casing 12, and translate away therefrom, repeatedly if necessary, without any premature delatching occurring.

Once stable, steady descent of the airborne load has been achieved under a fully inflated parachute, the gap "g" (FIG. 6) between upper casing 12 and lower load suspending assembly 14 will settle to a value which may be relatively large if load 41 is a heavy payload, e.g. 227 kg (500 pounds), and relatively small if load 41 is a lighter payload, e.g. 34 kg (75 pounds). Locking tooth 76 on rack wedge 58 engages with toothed collar 80 on rack 39 with lapsing of the time delay (FIG. 6). The rack becomes locked against any further vertical movements relative to upper casing 12. Pushrod 56 is preferably a compressible arm to assure that locking tooth 76 on rack wedge 58 will be instantly driven and seated between teeth on rack collar 80 under a sudden upward movement of rack 39 (FIG. 7). The time delay for this action to occur is achieved with timer 54, timed to occur after the parachute is open and stable, based on foreknowledge of how long parachute inflation and stabilization is required in a worst case.

When payload 41 makes ground contact (FIG. 8), the force created by load 41 drops off suddenly towards zero, and the gap "g" between upper casing 12 and lower load suspending assembly 14 moves toward zero in response thereto. Retraction of assembly 14 is driven by the main spring action of layered non-linear spring stacks 50. However, because rack 39 remains in a locked condition it is not free to move upwardly with other components of the load suspending assembly when the load weight on the device moves towards zero. As a result of pin 40 remaining stationary, release arm 32 mounted on connecting pin 34 is forced downwardly in a clockwise movement causing edge 30 to pivot upwardly from locking edge 28 of the release latch 24 to instantaneously and reliably delatch when load 41 drops to about 25 to 40 percent of its steady descent value. The ground disconnecting device delatches without the load weight on the device dropping to zero.

Figure 9:
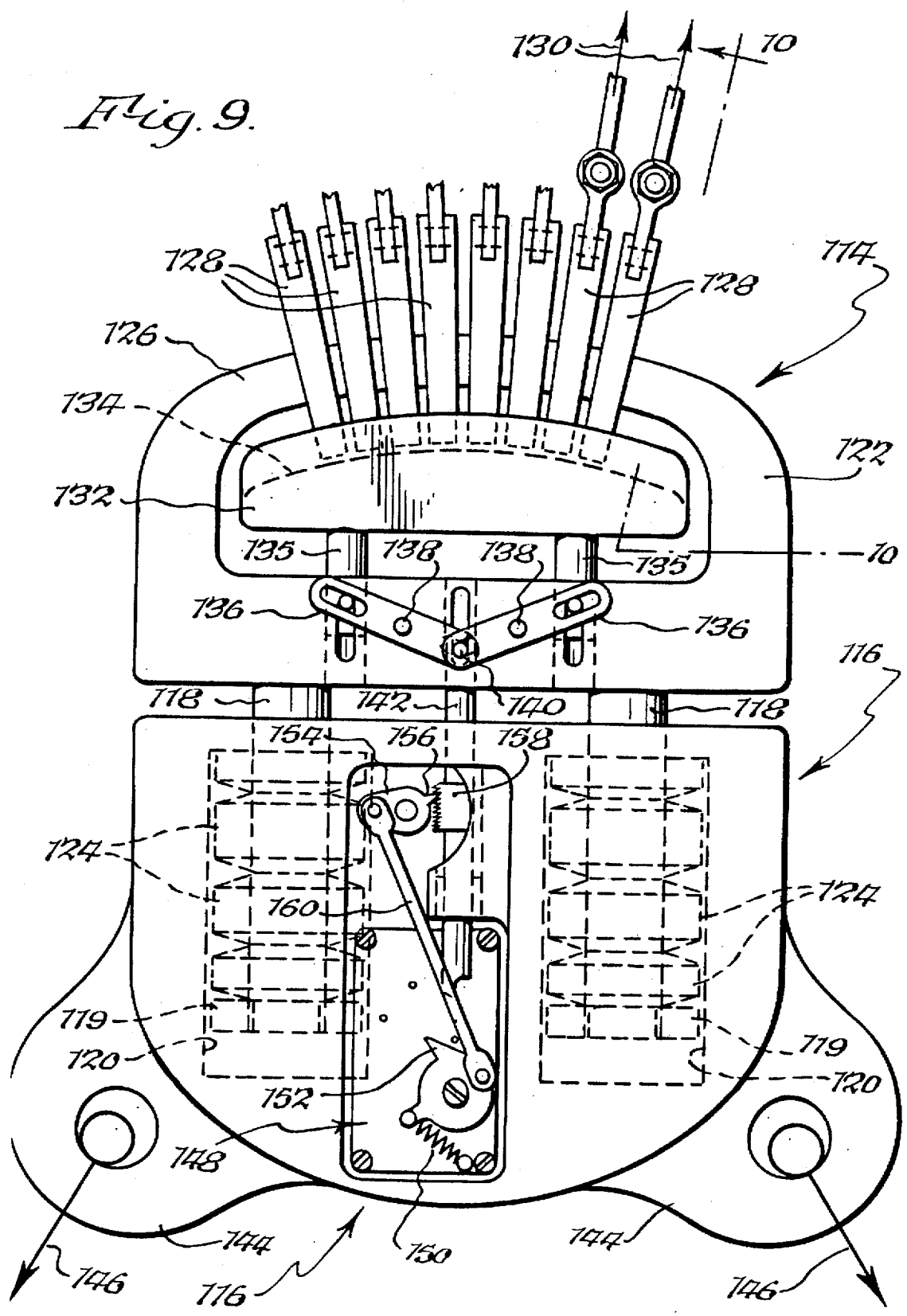
FIG. 9 is a side elevational view of an alternative embodiment of the parachute ground disconnecting device of the invention for large capacity loads.
Figure 10:
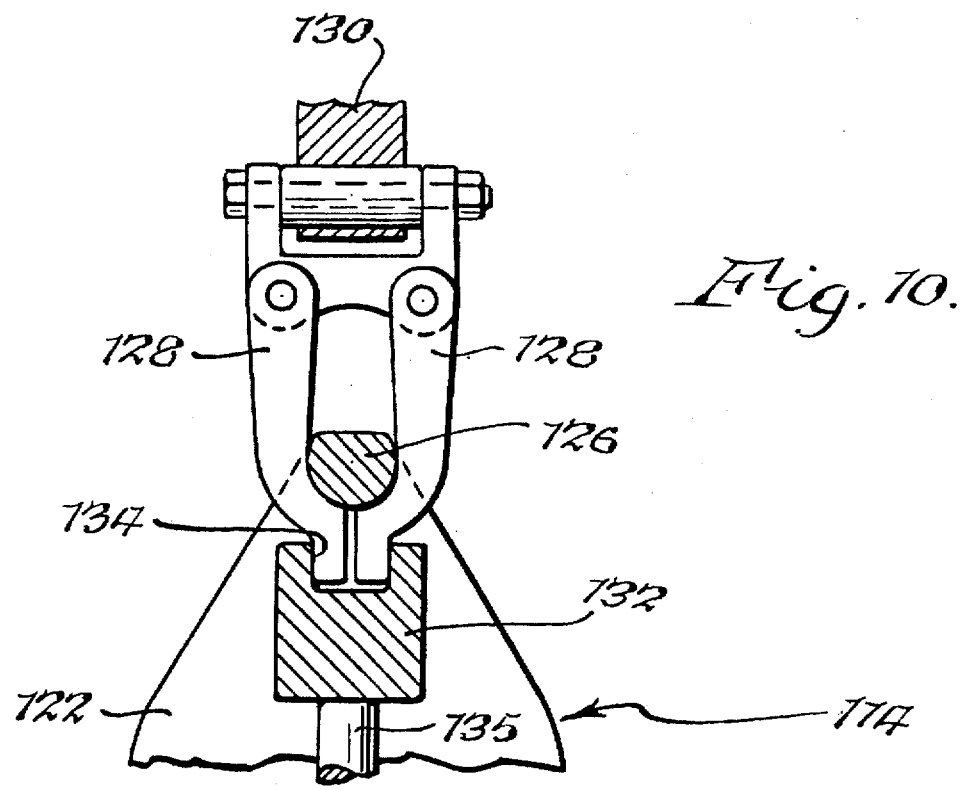
FIG. 10 is a view of the parachute riser fingers in locked position taken along line 10—10 of FIG. 9.
Figure 11:
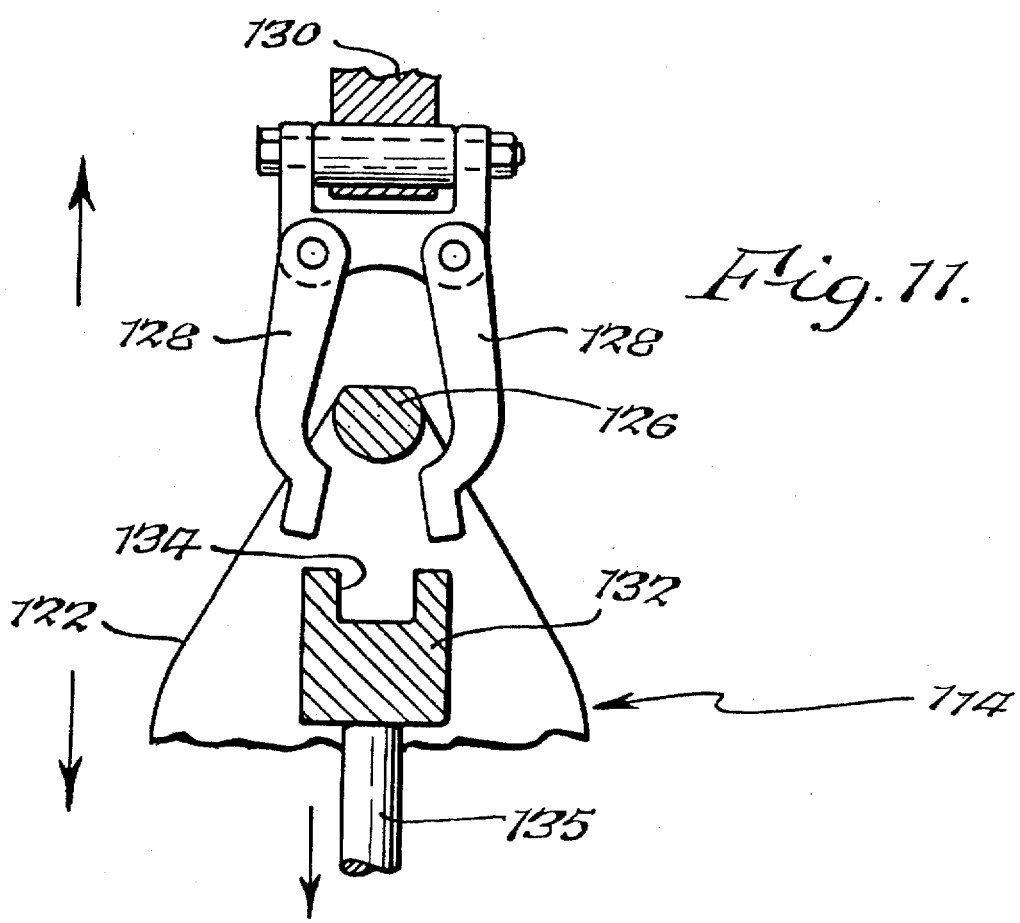
FIG. 11 is a view of the parachute riser fingers of FIG. 10 at the time of release and separation of the parachutes.

FIGS. 9–11 relate to a further embodiment of the parachute ground disconnecting device incorporating the concepts of the invention for maintaining a substantially constant release load percent. This embodiment is especially adapted for heavier loads, such as trucks, armored vehicles, and the like, which may weigh from about 2,275 kg (5,000 pounds) to about 27,000 kg (60,000 pounds), and more. The heavy duty ground disconnecting device consists of an upper parachute disconnecting block 114, and an axially aligned lower load suspending casing 116 which is movable relative to the parachute disconnecting block. The parachute disconnecting block consists of an outer generally D-shaped frame 122 having dual spaced rods 118 and terminal nuts 119, each rod and nut extending downwardly into cylindrically shaped interior spaces 120 in load suspending casing 116. The rods and nuts have a plurality of non-linear spring stacks 124, such as disk springs previously discussed. The stacks are preferably of diminished size towards the lowermost end of cylinders 120. The spring configuration is characterized by a non-linear force displacement permitting load disconnection to occur throughout the rated weight capacity of the device when tension on the device falls to about 25 to about 40 percent of the real load weight upon ground contact.

Outer frame 122 of the parachute disconnecting block also includes a support bar 126 for holding multiple parachute riser fingers 128 as connectors for parachutes 130 shown by arrows. Each riser finger 128 and parachute can have a rated weight capacity, for example, of 2273 kg (5,000 pounds). While the device of FIG. 9 is illustrated with eight riser fingers and parachutes for a total capacity of 18,182 kg (40,000 pounds) this embodiment is intended to have up to twelve or more such riser fingers for even larger payloads.

Parachute disconnecting block 114 also includes a vertically slidable riser finger retainer 132 (spring loaded into position) for locking and also releasing the parachute riser fingers 128 when the suspended load makes contact with the ground and the weight of the load is reduced. The vertically slidable retainer 132 includes a generally U-shaped slot 134 (shown best by FIGS. 10–11) at the head of the retainer for holding the fingers in a locked position around support bar 126 of outer frame 122. Riser finger retainer 132 includes parallel vertical rods 135, and arms 136 mounted for rotation on their respective central axes by pins 138, each vertical rod 135 having an arm 136 slidably mounted at a first end. The second ends of arms 136 are slidably mounted to the upper end 140 of rack 142. It will be understood the device includes spring means (not shown) for maintaining riser finger retainer 132 in an elevated position wherein the riser fingers are locked together around support bar 126 for securing the parachutes.

Lower load suspending casing 116 consists of load rings 144 for connecting payload 146, shown by arrows; timer 148 with bellcrank 150 spring loaded for counter clockwise rotation and bellcrank locking ledge 152; rotatable rack wedge 154 having locking tooth 156 for engaging toothed collar 158 mounted on rack 142. Rack wedge 154 and bellcrank 150 are interconnected by pushrod 160. Counter clockwise rotation of bellcrank 150 results in clockwise rotation of rack wedge 154 and locking tooth 156 for engagement with teeth on toothed collar 158 causing locking of rack 142 from vertical movement after the airborne load has achieved steady descent and the delay provided by timer 148 has lapsed.

FIG. 10 illustrates the locked position of parachute riser fingers 128 during initial deployment and steady descent of the load, prior to ground contact. When the running timer becomes exhausted and rack 142 becomes locked, with ground contact of load 146 and the weight of the load being reduced main springs 124 retract lower load suspending casing 116. Because rack 142 is locked retraction of casing 116 results in rotational movement of arms 136 and retraction of riser finger retainer 132 (See FIG. 11) releasing riser fingers 128 from U-shaped slot 134 to disengage the parachutes from the device and payload.

Figure 12:
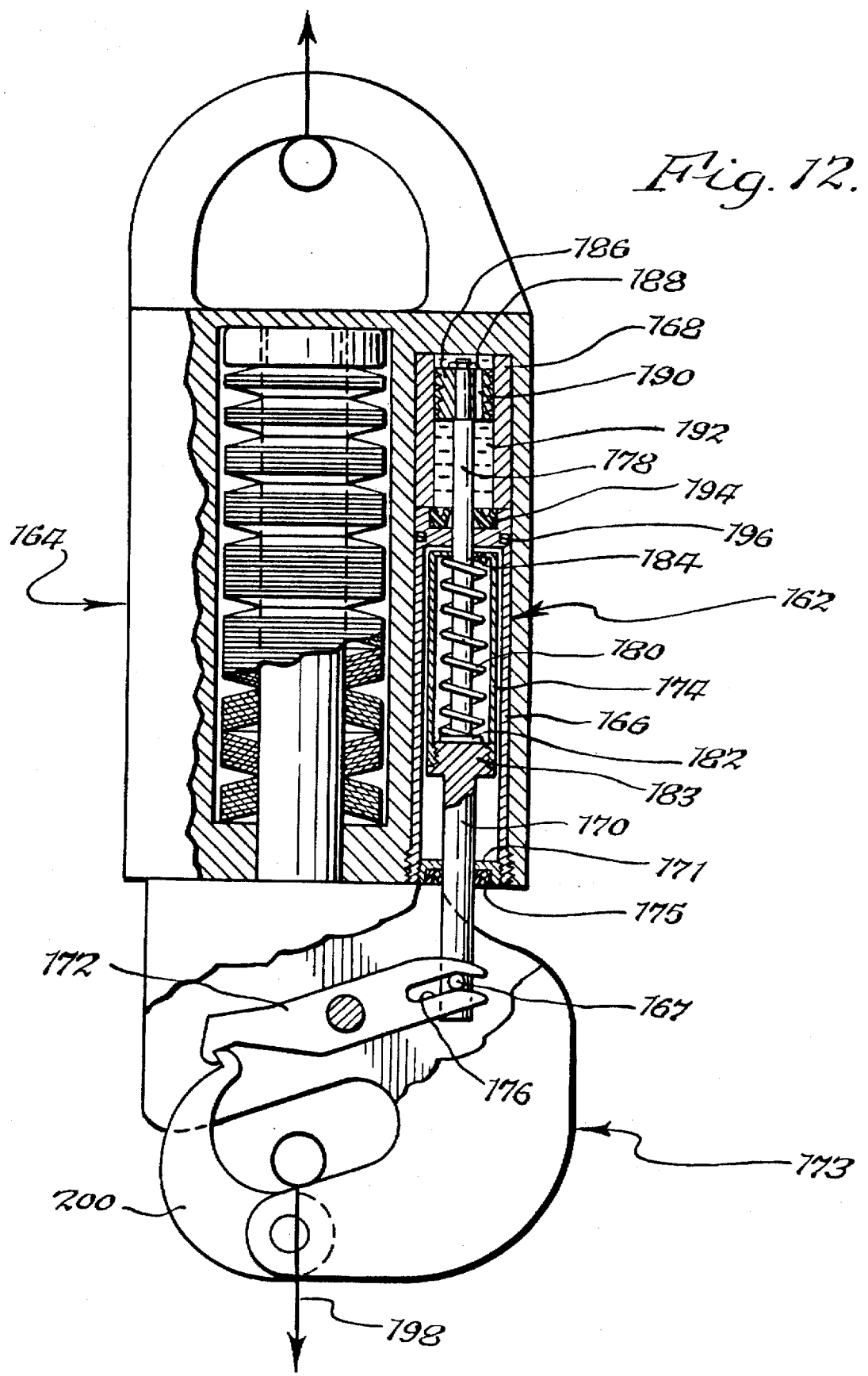
FIG. 12 is a side elevational view of an alternative embodiment of the parachute ground disconnecting device of the invention.
Figure 20:
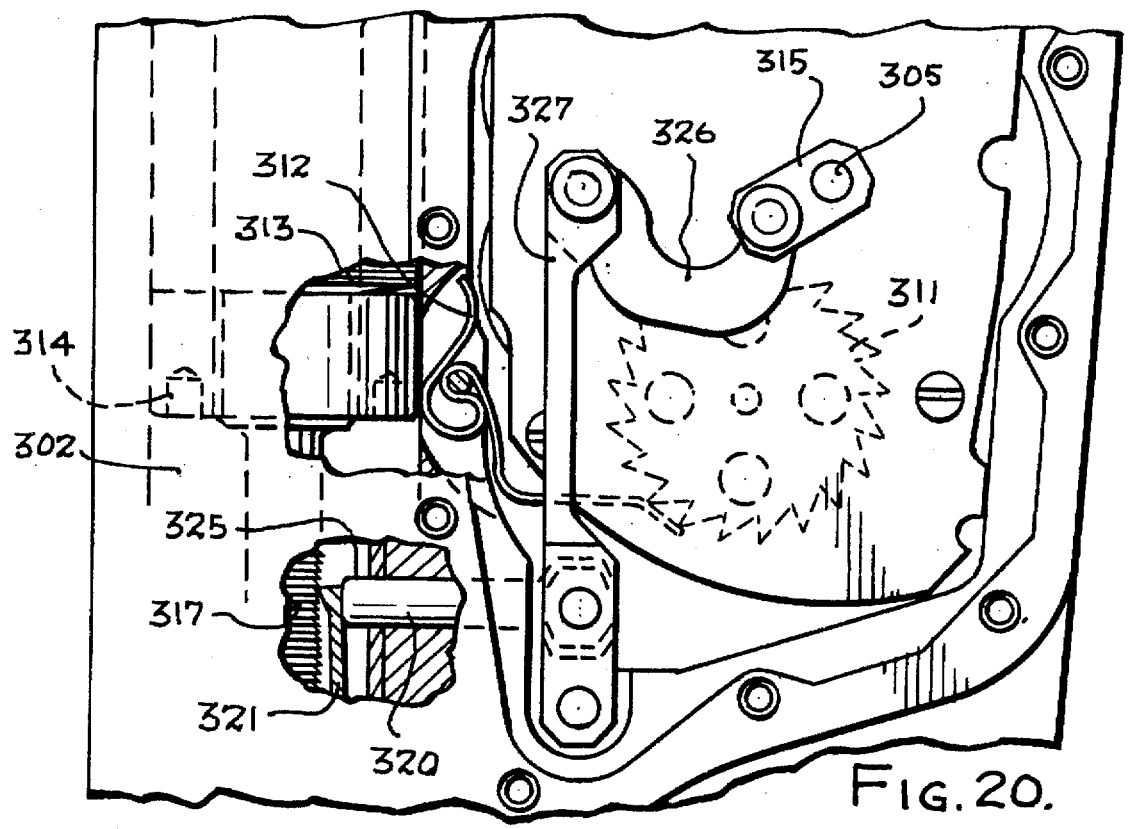
FIG. 20 is an enlarged fragmentary side elevation similar to FIG. 15, with cover plate removed and several areas broken away showing the timer output pin contacting the pawl bell.
Figure 21:
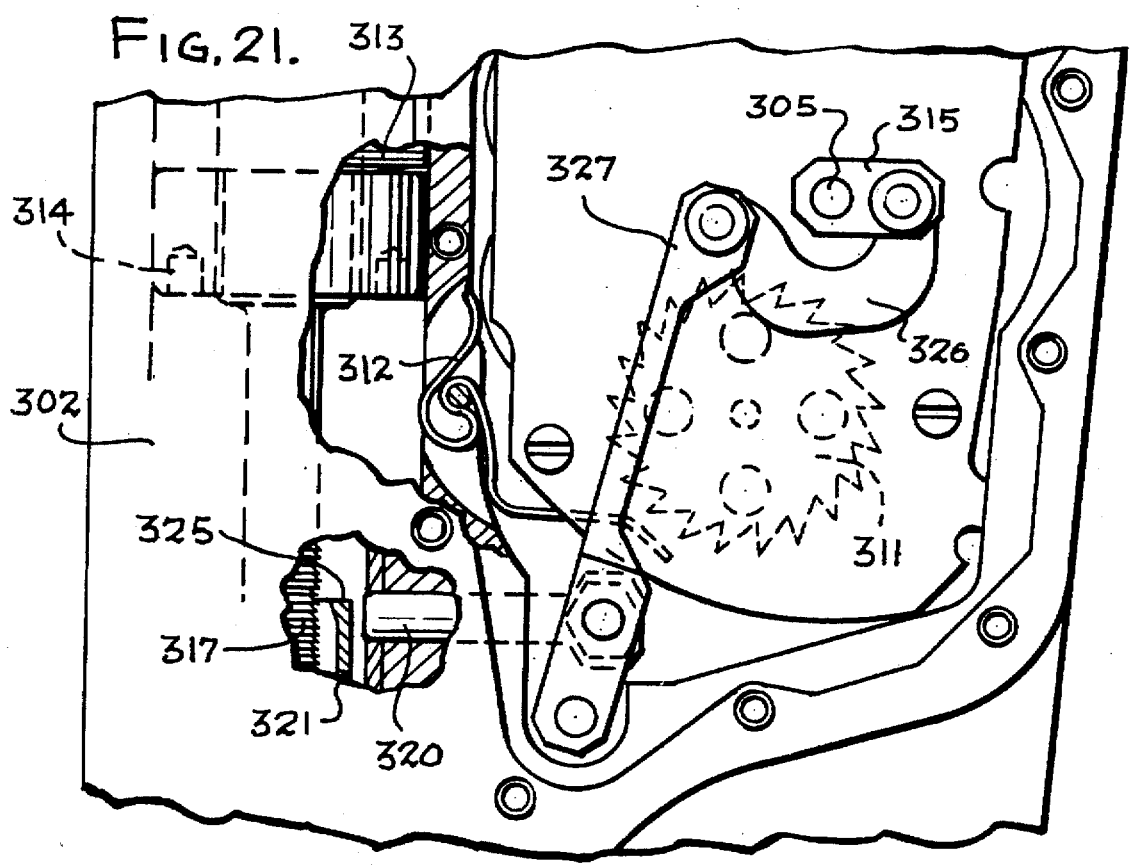
FIG. 21 is a view similar to FIG. 20 showing the timer output pin spaced from the pawl bell.

FIG. 12 is a further embodiment of the ground disconnecting device which provides the important advantages of constant RLPs in the range of 25 to 40 percent of the real load weight. This alternative embodiment, like those previously discussed, also provides ever diminishing deflection of the lower suspending assembly additional load applied using non-linear springs and fixed latch geometry. The device of FIG. 12 is especially useful when specific time delays are less critical beginning with the initial transient period of parachute deployment to stable descent occurs. The device offers the advantages of a more simplified design, increased ruggedness, fewer exterior seals, greater compactness and fully automatic resetting, all without trade-offs in constant RLPs.

Instead of employing a timer with separate gear train and escapement, bellcrank, pushrod, rack and rack wedge for locking the rack after the initial transient period of parachute deployment according to the prior embodiments, the device of FIG. 12 utilizes a load release timer 162, which serves an equivalent function of the aforementioned elements. Load release timer 162, which may include devices such as an hydraulic dash-pot, is positioned in the interior of upper casing 164, and consists of a guide gland or sleeve 166, and an upper axially aligned liner 168. A vertically positioned pushrod 170 is joined at a first end to release arm 172 of the lower suspending assembly 173 by means of pin 167 for movement in slot 176. Pushrod 170 at a second end is threaded to pushrod cylinder 174 and is retained by means of guide 171. Low drag wiper seal 175 is useful for excluding foreign matter. Load release timer 162 also utilizes a ram 178 axially aligned with pushrod 170. The interior of pushrod cylinder 174 includes a spring 180 coiled around the lower portion of ram 178. Spring 180 is in contact with ram base 182 at a first end and flange 184 of pushrod cylinder 174 at a second end. Ram base 182 makes contact with pushrod head 183 when the device is in locked position and not under load as illustrated by FIG. 12. The upper end of ram 178 also includes a piston 186 retained by nut 188. Piston 186 includes a valve aperture 190 for transmission of a non-compressible fluid 192, such as hydraulic oil from the underside of the piston to the upper side thereof when compressed downwardly. Accordingly, valve aperture 190 is of sufficient dimension to allow regulated leakage flow-through of fluid 192 at a slow rate. Fluid 192 is retained by seal 194 and O-ring 196.

Operation of the device of FIG. 12 includes the step of applying a load 198 to produce a lowering of suspending assembly 173 from the upper casing 164 to produce a gap "g" (not shown). This also results in a lowering of pushrod 170 and push rod cylinder 174 which also creates a gap between ram base 182 and pushrod head 183. Because spring 180 is compressed by the downward movement of pushrod cylinder 174 there is a tendency of the gap between ram base 182 and pushrod head 183 to close in a slow regular manner, dampened by the action of piston 186 which allows control of the rate of downward movement by forcing hydraulic fluid 192 through aperture 190.

If load 198 is relieved partially or completely within, for instance, 0.25 second of initial application, ram 178 will not have moved down sufficiently to have any effect on pushrod 170 than to cause a minor tremor in release arm 172. But, assuming sufficient time has lapsed e.g. 2 to 20 seconds, after deployment and steady descent occurs the gap between ram base 182 and pushrod head 183 will close up completely. When ground contact occurs the gap "g" (not shown) between the suspending assembly 173 and the upper casing 164 rapidly closes as the force of load 198 on the device drops. However, because ram 178 has been depressed downwardly pushrod 170 is blocked from moving vertically upwardly in a rapid manner on a time scale with ground contact. This causes release of load 198 to occur due to the "locked" state of pushrod 170 through clockwise movement of release arm 172 and unlocking of release latch 200.

After release of load 198, the gap "g" between the upper casing 164 and lower suspending assembly 173 becomes fully closed in the absence of a load. Return spring means (not shown for clarity) applies a firm counter clockwise torque to lever mounted release arm 172. This torque is communicated to pushrod 170 via pin 167 placing an upward thrust to the pushrod, pushrod cylinder 174, ram 178 and piston 186, all of which move upwardly in a slow and regular manner. After several seconds, typically 10 to 30 seconds, release arm 172 has moved to reset position, and made ready for reuse.

As with other embodiments of the invention, the device of FIG. 12 exhibits a constant RLP with load disconnection occurring throughout the rated load capacity of the device when tension falls to about 25 to about 40 percent of the actual load weight.

FIGS. 13–21 relate to a further embodiment of the parachute ground disconnecting device. FIGS. 13–15 show ground disconnecting device 300 having a parachute attachment means 330 located at one end of casing 302 for securing ground disconnecting device 300 to a parachute. At the other end of casing 302 is load suspending assembly 308. Load suspending assembly 308 includes a latch 303 for securing a load to ground disconnecting device 300.

Timer shaft 305 is provided with a slot 329 at one end for winding the timer 310 (best shown in FIGS. 13 and 16). Slot 329 is engaged by a suitable flat tool such as a screwdriver and wound in a clockwise direction. As shown in FIG. 13 and 14, casing 302 has raised bumps 306 to protect slot 329 from impact damage. Raised bumps 306 also serve to provide tactile timing reference marks for setting the time in low light conditions. Slot 329 can be turned to align with raised bumps 306 corresponding to the desired time setting. The time can be set to any value between about 5 seconds and about 20 seconds.

FIG. 15 shows a side elevational view of ground disconnecting device 300 opposite to the view of FIG. 13. FIG. 15 shows casing 302 including cover plate 375. Cover plate 375 allows access to the inner components (not shown) of ground disconnecting device 300 for maintenance purposes, and is secured to casing 302 by a plurality of screws 380.

FIG. 16 depicts a vertical section of ground disconnecting device 300 taken generally along line 16—16 of FIG. 14. The device is shown without a load applied. Parachute attachment means 330 is affixed to the upper end of rod 301. Parachute attachment means 330 may be affixed to rod 301 by a standard clevis and pin arrangement. Rod nut 314 is affixed to the lower portion of rod 301. In the no-load condition shown, rod nut 314 rests at its lower extreme position within casing 302. Disk spring stack 313 is disposed between rod 301 and casing 302. Disk spring stack 313 is preferably a non-linear disk type spring which limits deflection of rod 301 in relation to casing 302 when a load is applied to ground disconnecting device 300.

Rod nut 314 acts on interrupter clip 312 to hold interrupter clip 312 in contact with escapement 311. As long as contact is maintained between interrupter clip 312 and escapement 311, timer 310 cannot run.

The lower portion of casing 302 includes load suspending assembly 308. Load suspending assembly 308 is depicted in the latched position and includes latch 303 and release arm 304. Spring and pin assembly 307 exerts force to maintain release arm 304 in the latched position with latch 303 prior to ground contact by the load.

When a load is applied to load suspending assembly 308, casing 302 moves downward and rod 301 moves upward out of casing 302, against the action of disk spring stack 313. Rod nut 314 moves upward with rod 301. Interrupter clip 312 is moved out of contact with escapement 311 by the upward motion of rod nut 314 thereby allowing timer 310 to run. Preferably, the distance rod nut 314 must move before interrupter clip 312 is moved out of contact with escapement 311 is a fraction of the total upward distance rod nut 314 moves under normal load conditions.

Timer 310 can be any conventional timer means and may be similar to the timer means described in connection with previously described embodiments of the invention. Timer 310 includes timer output pin 320, shown in greater detail in FIGS. 20 and 21. Timer output pin 320 moves toward pawl bell 321 under the action of push rod 327. As timer 310 runs, link means 315 rotates in a clockwise direction about timer shaft 305 causing arm 326 to move push rod 327 in the direction of rod 301. Timer output pin 320 is pivotally mounted on the lower portion of push rod 327. As push rod 327 moves toward rod 301, timer output pin 320 is moved laterally toward pawl bell 321.

As shown in FIGS. 16–18 the lower portion of rod 301 is a rack 317 comprising a plurality of grooves or teeth 340. When no load is applied to ground disconnecting device 300 rack 317 resides within pawl bell 321. Rack 317 is centrally suspended so as to be freely vertically moveable within pawl bell 321 as long as timer 310 is running. The maximum stroke of rack 317 under fluctuating load weight should not be so great as to take rack 317 completely out of pawl bell 321. In other words, one of the grooves or teeth 340 of rack 317 is always adjacent to pawl edge 325 regardless of the weight of the load.

FIG. 17 shows the upper portion of pawl bell 321. Pawl edge 325 is a sharp inward facing machined edge which forms a circular pawl capable of being positively engaged with any one of the teeth 340 of rack 317. As previously stated, timer 310 advances timer output pin 320 toward pawl bell 321 as timer 310 runs. When timer 310 reaches the end of the set time, timer output pin 320 pushes pawl bell 321 and pawl edge 325 into tight engagement with one of the teeth 340 of rack 317 as shown in FIG. 18. Once pawl bell 321 is engaged with one of the teeth 340 of rack 317, pawl bell 321 will move in synchronization with rack 317 and rod 301.

FIG. 19 is a horizontal cross sectional view taken along line 19—19 of FIG. 17. FIG. 19 shows rack 317 and teeth 340 centrally suspended within pawl bell 321. Pawl edge 325 remains spaced at a slight distance 342 from the outer circumference of teeth 340 while timer 310 is running.

In order for timer output 320 pin to push pawl bell 321 into engagement with one of the teeth 340 of rack 317, timer output pin 320 must overcome the resisting elastic cantilever force on pawl bell 321 exerted by music wire column 322, shown in FIG. 16. Music wire column 322 is disposed within pawl bell 321 and maintains pawl bell 321 in axial alignment with rack 317 until timer output pin 320 laterally deflects pawl bell 321.

Music wire column 322 is affixed at its other end to cup pin 323. Because music wire column 322 is rigid in the vertical direction, cup pin 323 will move vertically in synchronization with pawl bell 321. During descent, spring 324 holds cup pin 323 in contact with cup stop 319, and limits downward deflection of cup pin 323. Cup stop 319 is permanently located within casing 302 by dog grub screw 318.

Upon ground contact by a suspended load (not shown), bullet nosed end 309 of cup pin 323 is driven downward, causing release arm 304 to rotate clockwise. Release arm 304 releases latch 303 after slightly less that about 10° of clockwise rotation, causing the desired release of the load from load suspending assembly 308.

Pawl bell 321 and cup pin 323 sustain only brief downward deflection before pawl edge 325 moves past timer output pin 320. Once pawl bell 321 is free from the laterally deflecting force of timer output pin 320, pawl bell 321 returns to its axially aligned and centered position underneath timer output pin 320. The distance pawl bell 321 must travel to pass timer output pin 320 is preferably just slightly more than necessary to reliably delatch release arm 304 from latch 303. This prevents jamming of ground disconnecting device 300 and allows the device to be easily reset after having been operated under heavy load conditions.

Preferably, Rod 301 is free to rotate about the vertical axis. About 2° of rotational freedom is desirable at the upper end of rod 301, where rod 301 is affixed to parachute attachment means 330. If the upper end of rod 301 is held too rigid, the components of ground disconnecting device 300 may be damaged.

As with the previous embodiments the device of FIG. 13 exhibits a constant RLP with load disconnection occurring throughout the rated load capacity of the device when tension falls to about 25 to about 40 percent of the actual load weight.

While the invention has been described in conjunction with various embodiments, they are illustrative only. Accordingly, many alternatives, modifications and variations will be apparent to persons skilled in the art in light of the foregoing detailed description, and it is therefore intended to embrace all such alternatives and variations as to fall within the spirit and broad scope of the appended claims.

I claim:

1. A parachute ground disconnecting device, which comprises a casing with at least one interior compartment, a load suspending assembly located at a first end of said device, means for connecting said device to a parachute located at a second end of said device, latching means for securing a load on said load suspending assembly during more turbulent initial period of descent under force of load, locking means for restricting movement of said latching means during a period of stable steady descent under force of load, timer means for delayed actuation of said locking means for restricting movement of said latching means during said period of stable steady descent, and spring means positioned in the interior compartment of said casing for limiting downward deflection of said load suspending assembly, for retraction of said load suspending assembly on ground contact of said load and for automatically disengaging said latching means with retraction of said load suspending assembly.

2. The ground disconnecting device of claim 1 characterized by maintaining a substantially constant release load percentage.

3. The ground disconnecting device of claim 2 wherein said spring means is characterized by a non-linear force displacement curve permitting load disconnection to occur throughout the rated weight capacity of said device when tension on the device falls to an adjustable range of 25 to about 70 percent of the load weight.

4. The ground disconnecting device of claim 2 wherein said spring means is comprised of a plurality of disk type springs placed in stacks to provide ever diminishing deflection with additional load applied to said load suspending assembly.

5. A parachute ground disconnecting device for maintaining a substantially constant release load percentage, which comprises a casing with at least one interior compartment, a load suspending assembly located at a first end of said device, means for connecting said device to a parachute located at a second end of said device, means for locking and releasing a load on said load suspending assembly comprising a longitudinally movable bar or rack which freely moves with fluctuating load weights during the initial period of descent, spring means positioned in the interior compartment of said casing characterized by retaining said device in a retracted position when not under load and limiting downward deflection when under force of load, and timer means for automatically actuating said means for locking and releasing a load on said load suspending assembly after lapse of a sufficient time interval for stabilized descent of the parachute and load and for release of said load from said load suspending assembly as said spring means returns towards a fully retracted position upon ground contact by the load.

6. A parachute ground disconnecting device for maintaining a substantially constant release load percentage, which comprises a casing with an interior compartment and means for connecting with a parachute, an axially aligned load suspending assembly movable relative to said casing, said load suspending assembly comprising a rod extending into said casing interior, connecting means for holding a load, means for locking and releasing a load on said connecting means, and a rack for engaging said locking and releasing means of said load suspending assembly at a first end, said rack extending into said casing interior at a second end; spring means characterized by limited deflection positioned in said casing interior for engaging with said rod for retaining said load suspending assembly in a retracted position when not under load and for limiting the separation of said load suspending assembly away from said casing when under force of a load, timer means for providing a delay interval corresponding substantially to the period running from the time of opening of a parachute to the time of stabilized descent of said parachute and load, rack locking means automatically actuated by said timer means for engaging said rack and preventing longitudinal movement of said rack during stabilized descent and when the distance between said casing and said load suspending assembly moves towards zero upon contact with the ground to release said locking and releasing means for disconnecting a load from the device.

7. The parachute ground disconnecting device of claim 6 wherein said spring means is characterized by a non-linear force displacement curve permitting load disconnection to occur throughout the rated weight capacity of said device when tension on the device falls to about 25 to about 40 percent of the load weight.

8. The parachute ground disconnecting device of claim 6 wherein said spring means is comprised of a plurality of disk type springs placed in stacks to provide ever diminishing deflection of the load suspending assembly with additional load applied thereto.

9. The parachute ground disconnecting device of claim 8 wherein the disk type springs are arranged in multiple stacks of diminishing numbers towards the end of said rod farthest from the load suspending assembly.

10. The parachute ground disconnecting device of claim 7 wherein the load suspending assembly comprises a load engaging hook, a release latch pivotally mounted to said load engaging hook, and a lever mounted release arm for locking and releasing said release latch.

11. The parachute ground disconnecting device of claim 7 wherein the second end of said rack comprises timer locking means for restricting actuation of said timer means, said timer means being automatically actuated with application of a load to said load suspending assembly.

12. The parachute ground disconnecting device of claim 7 wherein said rack comprises a plurality of adjacent teeth, said rack and teeth automatically indexing with movement of said load suspending assembly for engagement by said rack locking means in at least one of said teeth.

13. The parachute ground disconnecting device of claim 10 wherein said spring means provides the energy for retraction of the load suspending assembly towards said casing on ground contact by the load for disengagement of said lever mounted release arm from said release latch.

14. The parachute ground disconnecting device of claim 6 wherein said timer means is a gear train and escapement type providing a running time of from about 5 to 20 seconds.

15. The parachute ground disconnecting device of claim 6 wherein said timer means is a pneumatic time delay type.

16. The parachute ground disconnecting device of claim 6 wherein said timer means is a hydraulic time delay type.

17. The parachute ground disconnecting device of claim 14 including pull pin means for activation of said timer when lines of the parachute reach full pay-out.

18. A high capacity cargo parachute ground disconnecting device for maintaining a substantially constant release load percentage, which comprises a parachute disconnecting block and an axially aligned load suspending casing having interior compartments and means for connecting a load, said load suspending casing being movable relative to said parachute disconnecting block, said parachute disconnecting block comprising plurality of rods extending into the interior of said load suspending casing, an outer frame member for supporting a plurality of parachute riser fingers and parachutes when said fingers are locked, an axially slidable spring loaded retainer assembly positioned adjacent to said outer frame member for locking and releasing parachute riser fingers, and a rack for engaging said slidable retainer assembly at a first end, said rack extending into the interior of said load suspending casing at a second end, spring means characterized by limited deflection and positioned in said load suspending casing for engaging with the rods of said parachute disconnecting block for retaining said load suspending casing in a retracted position when not under load and for limiting the stroke of said load suspending casing away from said parachute disconnecting block when under force of a load, timer means for providing a delay interval corresponding substantially to the period running from the time of opening of a parachute to the time of stabilized descent of the parachute and load, rack locking means automatically actuated by said timer means for engaging said rack and preventing longitudinal movement of said rack during stabilized descent and when the distance between said load suspending casing and said parachute disconnecting block moves towards zero upon contact of the load with the ground to retract said axially slidable retainer assembly for releasing the parachute riser fingers and parachute from said device.

19. The parachute ground disconnecting device of claim 18 wherein said spring means is characterized by a non-linear force displacement curve permitting riser fingers and parachute disconnection to occur throughout the rated weight capacity of said device when tension on the device falls to about 25 to about 40 percent of the load weight.

20. The parachute ground disconnecting device of claim 18 wherein said spring means is comprised of a plurality of disk type springs placed in stacks of varying numbers for a short stroke of said load suspending assembly even under capacity loads.

21. The parachute ground disconnecting device of claim 20 wherein the disk type springs are arranged in stacks to provide ever diminishing deflection of the load suspending casing with additional load applied.

22. The parachute ground disconnecting device of claim 19 wherein the second end of said rack comprises timer locking means for restricting actuation of said timer means, said timer means being automatically actuated with application of a load to said load suspending casing.

23. The parachute ground disconnecting device of claim 19 wherein said rack comprises a plurality of adjacent teeth, said rack and teeth automatically indexing with movement of said load suspending casing for engagement by said rack locking means.

24. The parachute ground disconnecting device of claim 18 wherein said timer means is a gear train and escapement type providing a running time of from about 5 to 20 seconds.

25. The parachute ground disconnecting device of claim 18 wherein said timer means is a pneumatic time delay type.

26. The parachute ground disconnecting device of claim 18 wherein said timer means is a hydraulic time delay type.

27. The parachute ground disconnecting device of claim 24 including pull pin means for activation of said timer when lines of the parachute reach full payout.

28. A parachute ground disconnecting device for maintaining substantially constant release load percentages, which comprises a casing with an interior compartment and means for connecting with a parachute, an axially aligned load suspending assembly movable relative to said casing, said load suspending assembly comprising a rod extending into said casing interior, connecting means for holding a load, means for locking and releasing a load on said connecting means, load release timer means housed in said casing interior compartment, spring means housed in said casing interior for engaging with said rod for retaining said load suspending assembly in a retracted position when not under load and for limiting the stroke of said load suspending assembly away from said casing when under force of a load, said load release timer means comprising a pushrod cylinder, an axially aligned pushrod at a first end engaging said pushrod cylinder and linking with said locking and releasing means of said load suspending assembly at a second end, ram means axially aligned with said pushrod cylinder and pushrod, and means for dampening vertical movement of said ram means when under compression.

29. The parachute ground disconnecting device of claim 28 wherein said dampening means comprises a piston with an aperture and hydraulic fluid for gradual displacement through said piston aperture over a period ranging from about 2 to 20 seconds.

30. The parachute ground disconnecting device of claim 28 wherein said spring means is characterized by a non-linear force displacement curve permitting load disconnection to occur throughout the rated weight capacity of said device when tension on the device falls to about 25 to about 40 percent of the load weight.

31. The parachute ground disconnecting device of claim 30 wherein said spring means is comprised of a plurality of disk type springs placed in stacks to provide ever diminishing deflection of the load suspending assembly with additional load applied thereto.

32. The parachute ground disconnecting device of claim 31 wherein the disk type springs are arranged in multiple stacks of diminishing numbers towards the end of said rod farthest from said load suspending assembly.

33. The parachute ground disconnecting device of claim 28 wherein the load suspending assembly comprises a load engaging hook, a release latch pivotally mounted to said load engaging hook, and a lever mounted release arm for locking and releasing said release latch.

34. The parachute ground disconnecting device of claim 28 wherein said load release timer means comprises an hydraulic dashpot.

35. A parachute ground disconnecting device comprising:
a casing with at least one interior compartment;
means for connecting said device to a parachute located at a first end of said casing;
a load suspending assembly having latching means located at a second end of said casing;
means for locking and releasing a load on said load suspending assembly comprising:
a longitudinally movable bar affixed at one end to said means for connecting said device to a parachute;
axially aligned means for engaging with said longitudinally moveable bar and for releasing a load on said load suspending assembly on ground contact;
means for laterally deflecting said axially aligned means for engaging with said longitudinally moveable bar and for releasing a load on said load suspending assembly;
timer means for actuating said means for laterally deflecting said axially aligned means for engaging with said longitudinally moveable bar and for releasing a load on said load suspending assembly on ground contact, and
spring means positioned between said longitudinally movable bar and said casing, said spring means characterized by limiting downward deflection of said casing from said longitudinally moveable bar.

36. The ground disconnecting device of claim 35 characterized by maintaining a substantially constant release load percentage.

37. The ground disconnecting device of claim 35 wherein said spring means is comprised of a plurality of disk type springs placed in stacks to provide ever diminishing deflection with additional load applied to said load suspending assembly.

38. The ground disconnecting device of claim 35 wherein said spring means is characterized by a non-linear force displacement curve permitting load disconnection to occur throughout the rated weight capacity of said device when tension on the device falls to an adjustable range of about 25 percent to about 70 percent of the load weight.

39. The ground disconnecting device of claim 35 wherein said longitudinally movable bar comprises a rack having a plurality of adjacent teeth.

40. The ground disconnecting device of claim 39 wherein said axially aligned means for engaging with said longitudinally moveable bar and for releasing a load on said load suspending assembly on ground contact comprises:

cup means including means for engaging with at least one of the teeth of said rack;

a vertically rigid wire having one end engaged with said cup means, and a vertically moveable pin means for contacting and de-latching said latching means connected to the other end of said vertically rigid wire.

41. The ground disconnecting device of claim 39 wherein said axially aligned means for engaging with said longitudinally moveable bar and for releasing a load on said load suspending assembly on ground contact comprises:

a generally bell shaped pawl member adapted to engage with at least one of the teeth of said rack;

a vertically moveable pin means for delatching said latching means on ground contact;

a generally rigid wire column disposed between said generally bell shaped pawl member and said vertically moveable pin means for maintaining said generally bell shaped pawl member in an axially aligned position and for translating vertical motion of said generally bell shaped pawl member to said vertically moveable pin means;

said generally bell shaped pawl member being centrally positioned around the exterior of said rack without engaging therewith until said timer has substantially run out.

42. The ground disconnecting device of claim 40 wherein said means for laterally deflecting said axially aligned means for engaging with said longitudinally moveable bar and for releasing a load on said load suspending assembly comprises a horizontally moveable bar spaced from said cup means, said horizontally moveable bar traveling in a horizontal direction when said timer is activated and contacting said cup means causing deflection of said cup means when said timer runs out.

43. The ground disconnecting device of claim 42 wherein said cup means is positioned on a vertical axis sufficiently close to said horizontally moveable bar to cause said cup means to disengage from said horizontally moveable bar and return to axial alignment after said vertically moveable pin means delatches said latch on ground contact.

44. The ground disconnecting device of claim 35 wherein said casing includes means for tactile determination of the set time.

* * * * *